US011839315B2

(12) United States Patent
Levin (10) Patent No.: US 11,839,315 B2
(45) Date of Patent: *Dec. 12, 2023

(54) CART LOCKING AND DISPENSING DEVICE

(71) Applicant: Freetail Acquisition LLC, Brooklyn, NY (US)

(72) Inventor: Arye Levin, Bnei-Brak (IL)

(73) Assignee: Freetail Acquisition LLC, Brooklyn, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/976,927

(22) Filed: Oct. 31, 2022

(65) Prior Publication Data

US 2023/0047495 A1    Feb. 16, 2023

Related U.S. Application Data

(63) Continuation of application No. 17/258,470, filed as application No. PCT/IL2019/050757 on Jul. 8, 2019, now Pat. No. 11,484,135.

(30) Foreign Application Priority Data

Jul. 8, 2018  (IL) .......................................... 260455

(51) Int. Cl.
    *A47F 10/04*    (2006.01)
    *G07F 7/06*     (2006.01)
    *B62B 3/14*     (2006.01)

(52) U.S. Cl.
    CPC ............ *A47F 10/04* (2013.01); *G07F 7/0627* (2013.01); *B62B 3/1404* (2013.01)

(58) Field of Classification Search
    CPC ... A47F 10/04; B62B 3/1404; Y10S 194/905; G07F 7/0636; G07F 7/0645; G07F 7/0681; G07F 7/0627
    See application file for complete search history.

(56) References Cited

U.S. PATENT DOCUMENTS

| 2,743,827 A | 5/1956 | Winokur et al. |
| 3,160,292 A | 12/1964 | Albrecht |

(Continued)

FOREIGN PATENT DOCUMENTS

| CN | 1610878 | 4/2005 |
| CN | 1671319 | 9/2005 |

(Continued)

OTHER PUBLICATIONS

Examination Report Under Sections 12 & 13 of the Patents Act, 1970 and the Patents Rules, 2003 dated Sep. 12, 2022 From the Government of India, Intellectual Property India, Patents, designs, Trade Marks, Geographical Indications, The Patent Office Re. Application No. 202127005214. (7 Pages).

(Continued)

*Primary Examiner* — Patrick D Hawn (57) ABSTRACT

A device for dispensing and locking carts disposed in a stack, comprising: a dual-lever mechanism, comprising: a locking lever which is blocking movement of a first cart of a plurality of carts disposed in a stack when in open position; a base adjacent to said locking lever which is movable forward and backward with respect to the stack; and a dispensing lever mounted on the base which is blocking movement of a second cart of the plurality of carts when in open position; and a drive belt driving the plurality of carts in parallel to movement of said base by moving forward and backward in coordination with the base.

13 Claims, 9 Drawing Sheets

(56) References Cited

U.S. PATENT DOCUMENTS

| | | | |
|---|---|---|---|
| 3,194,377 | A | 7/1965 | Fischbach et al. |
| 3,219,205 | A | 11/1965 | Grant |
| 3,561,567 | A | 2/1971 | Bradley |
| 3,837,455 | A | 9/1974 | Hurt |
| 3,882,982 | A | 5/1975 | Smith |
| 3,897,863 | A | 8/1975 | Peggs |
| 3,938,638 | A | 2/1976 | Moule |
| 3,978,959 | A | 9/1976 | Muellner |
| 4,149,341 | A | 4/1979 | Ackerson |
| 4,450,968 | A | 5/1984 | Muellner |
| 4,518,072 | A | 5/1985 | Muellner et al. |
| 4,518,073 | A | 5/1985 | Pastien |
| 5,526,916 | A | 6/1996 | Amdahl et al. |
| 5,921,373 | A | 7/1999 | Amdahl et al. |
| 6,024,203 | A | 2/2000 | Amdahl et al. |
| 2003/0059288 | A1 | 3/2003 | Robinson |
| 2004/0079934 | A1 | 4/2004 | Hempen et al. |
| 2017/0213413 | A1 | 7/2017 | Katoozian |
| 2021/0274948 | A1 | 9/2021 | Levin |

FOREIGN PATENT DOCUMENTS

| | | |
|---|---|---|
| CN | 101176127 | 5/2008 |
| CN | 102693558 | 9/2012 |
| DE | 8121899 | 11/1981 |
| DE | 9417531 | 12/1994 |
| DE | 102010054656 | 6/2012 |
| EP | 0433751 | 6/1991 |
| EP | 2466557 | 6/2012 |
| FR | 2739710 | 4/1997 |
| WO | WO 2017/122108 | 7/2017 |
| WO | WO 2020/012466 | 1/2020 |

OTHER PUBLICATIONS

International Preliminary Report on Patentability dated Jan. 21, 2021 From the International Bureau of WIPO Re. Application No. PCT/IL2019/050757. (8 Pages).
International Search Report and the Written Opinion dated Nov. 13, 2019 From the International Searching Authority Re. Application No. PCT/IL2019/050757. (14 Pages).
Interview Summary dated Aug. 6, 2019 From the Israel Patent Office Re. Application No. 260455 and its Translation Into English. (4 Pages).
Notice of Allowance dated Jun. 27, 2022 together with Interview Summary dated Jun. 15, 2022 from US Patent and Trademark Office Re. U.S. Appl. No. 17/258,470. (20 pages).
Notification About Necessity to Submit Additional Materials dated Mar. 30, 2022 From The Eurasian Patent Organization, The Eurasian Patent Office Re. Application No. 202190234. (3 Pages).
Notification of Office Action and Search Report dated Apr. 11, 2022 From the State Intellectual Property Office of the People's Republic of China Re. Application No. 201980048471.0 and its Summary in English. (8 Pages).
Notification of Requirement to Furnish Additional Materials dated Apr. 4, 2021 From The Eurasian Patent Organization, The Eurasian Patent Office Re. 202190234 and its Translation Into English. (5 Pages).
Office Action and Search Report dated Feb. 6, 2019 From the Israel Patent Office Re. Application No. 260455. (8 Pages).
Supplementary European Search Report and the European Search Opinion dated Jul. 30, 2021 From the European Patent Office Re. Application No. 19834089.5. (13 Pages).
Translation Notification About Necessity to Submit Additional Materials dated Mar. 30, 2022 From the Eurasian Patent Organization, The Eurasian Patent Office Re. Application No. 202190234. (2 Pages).
Communication Pursuant to Article 94(3) EPC dated Feb. 21, 2023 From the European Patent Office Re. Application No. 19834089.5 (24 Pages).
Notice of Reason(s) for Rejection dated Jun. 6, 2023 From the Japan Patent Office Re. Application No. 2021-500794 and its Translation Into English. (8 Pages).

CART LOCKING AND DISPENSING DEVICE

RELATED APPLICATIONS

This application is continuation of U.S. patent application Ser. No. 17/258,470 filed on Jan. 7, 2021, which is a National Phase of PCT Patent Application No. PCT/IL2019/050757 having International Filing Date of Jul. 8, 2019, which claims the benefit of priority of Israel Patent Application No. 260455 filed on Jul. 8, 2018. The contents of the above applications are all incorporated by reference as if fully set forth herein in their entirety.

FIELD AND BACKGROUND OF THE INVENTION

The present invention, in some embodiments thereof, relates to a cart locking and dispensing device and, more particularly, but not exclusively, to a device which accepts or releases one cart while locking another by a coordinated movement of levers blocking the carts and a drive belt.

When not used, shopping carts may be stored in a designated area, stacked one inside the other. When a cart is needed, for example by a customer, it is pulled from the stack. In some cases, a coin and/or other means have to be used to unlock the cart from the stack, for example to release a chain locking the cart to the next cart in the stack. In other cases, a payment has to be made in order to release the cart.

SUMMARY OF THE INVENTION

According to an aspect of some embodiments of the present invention there is provided a device for dispensing and locking carts disposed in a stack, comprising: a dual-lever mechanism, comprising: a locking lever which is blocking movement of a first cart of a plurality of carts disposed in a stack when in open position; a base adjacent to said locking lever which is movable forward and backward with respect to the stack; and a dispensing lever mounted on the base which is blocking movement of a second cart of the plurality of carts when in open position; and a drive belt driving the plurality of carts in parallel to movement of said base by moving forward and backward in coordination with the base.

Optionally, the open position is a raised position and the closed position is a lowered position.

Optionally, at least one of the dispensing lever and blocking lever has bent shape.

Optionally, at least one of the dispensing lever and blocking lever is changing position from the open position to a closed position to allow movement of a cart.

More optionally, the changing position is done by an engine.

More optionally, the changing position is controlled by an electronic device.

More optionally, the dispensing lever is connected to an engine by a set of shafts that are performing the changing position of the dispensing lever according to operation of the engine.

More optionally, the blocking lever is connected to an engine by a set of shafts that are performing the changing position of the blocking lever according to operation of the engine.

Optionally, the base is movable by an engine via a linear actuator.

Optionally, the base is movable over a rail.

Optionally, movement of the base is detected by at least one sensor.

Optionally, the drive belt is moved by a belt wheel operated by a belt engine.

Optionally, the belt engine is a step motor.

Optionally, the device further comprises an enclosure having slits for the dispensing lever and the blocking lever.

According to an aspect of some embodiments of the present invention there is provided a method for accepting a cart into a cart stack, comprising: holding a first cart of a plurality of carts disposed in a stack by a locking lever, the locking lever is at an open position so the locking lever is blocking movement of the first cart out of the stack; changing position of a dispensing lever from a closed position to an open position to block movement of a second cart out of the stack, the second cart is newly positioned at the end of the stack; changing position of the locking lever from the open position to a closed position; moving the dispensing lever forward to push the second cart into the stack; simultaneously driving the plurality of carts by a drive belt so the second cart may be positioned behind the locking lever; changing position of the blocking lever from the closed position to the open position so the blocking lever is blocking movement of the second cart out of the stack.

According to an aspect of some embodiments of the present invention there is provided a method for dispensing a cart from a cart stack, comprising: holding a first cart of a plurality of carts disposed in a stack by a locking lever, the locking lever is at an open position so the locking lever is blocking movement of the first cart out of the stack; changing position of a dispensing lever from a closed position to an open position; changing position of the locking lever from the open position to a closed position; driving the plurality of carts by a drive belt so a next cart of the plurality of carts is positioned behind the locking lever and the first cart is blocked behind the dispensing lever; changing position of the blocking lever from the closed position to the open position so the blocking lever is blocking movement of the next cart out of the stack; and changing position of the dispensing lever from the open position to the closed position to allow removal of the first cart from the stack.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a cart locking and dispensing device and, more particularly, but not exclusively, to a device which accepts or releases one cart while locking another by a coordinated movement of levers blocking the carts and a drive belt.

According to some embodiments of the present invention, there is provided a device for locking a stack of carts, such as shopping carts, for accepting a cart into the stack and for dispensing a cart out of the stack. The accepting and dispensing of the carts is based on a dual-lever mechanism that alternately releases or accepts a cart while locking the next one. A drive belt moves the stack of carts backward in accordance with the operation of the dual-lever mechanism which locks the carts and moves a cart forward into the stack. The dual-lever mechanism operates by coordinated movement of two levers, a locking lever and a dispensing lever mounted on a base which is movable forward or backward with respect to the stack of carts. The levers each have an open position and a closed position, for example a raised position that blocks a cart and a lowered position which allows a cart to be moved over the lever. In an initial state, the locking lever is in open position and locking the first cart in the stack, while the dispensing lever is in closed position and on the base which is located in a backward location.

When a cart is accepted into the stack, for example when a customer replaces the cart after shopping, the dispensing lever is raised to an open position to block the new cart. The locking lever is lowered to a closed position to allow the new cart to move into the stack. Then, the base moves forward, for example by an engine via a ball screw linear actuator, so that the dispensing lever pushes the new cart into the stack. The drive belt moves in accordance with the base, for example by an engine, and allow the move of the stack of carts forward to create room for the new cart. The locking lever is then raised to an open position to block the new cart, and the base and dispensing lever move to their initial positions.

When a cart is dispensed from the stack, the reversed process is performed. The dispensing lever is raised to an open position to block the first cart in the stack. The locking lever is lowered to a closed position to allow the first cart to move and be blocked instead by the dispensing lever. The drive belt then moves the stack of carts backward, so the first cart is blocked by the dispensing lever. The locking lever is then raised to an open position to block the next cart in the stack, to prevent it from being pulled out of the stack as well. The dispensing lever is lowered to a closed position to allow the first cart to be removed.

The movement of the drive belt and the base may be operated by one or more engines. The levers may be operated, for example, by engines, which may be connected to the levers by shafts. The engines may be controlled by an electronic device programmed to instruct the performance of the coordinated movements. The movement of the dispensing lever may be detected by sensors, such as mechanic and/or magnetic sensors.

The suggested device is suitable for almost any carts type and/or size available on the market, so it may be used for existing carts and cart lines with no need to acquire new or specific carts. Installation of the device requires no structural or mechanical changes to the carts and/or to the ground/floor of where the carts are stored (The carts' lines), and no extra space is needed than before the installation, so it is much cheaper and easier to deploy/install than other cart systems.

The device detects each cart uniquely, so once a customer returns the cart, the system needs no interaction from the customer to know that his cart has been returned. Also, the device physically and actively delivers the cart to the customer and accepts it back into the stack by pulling, so the customer does not need to walk into the carts line to pull the cart or to push it in.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
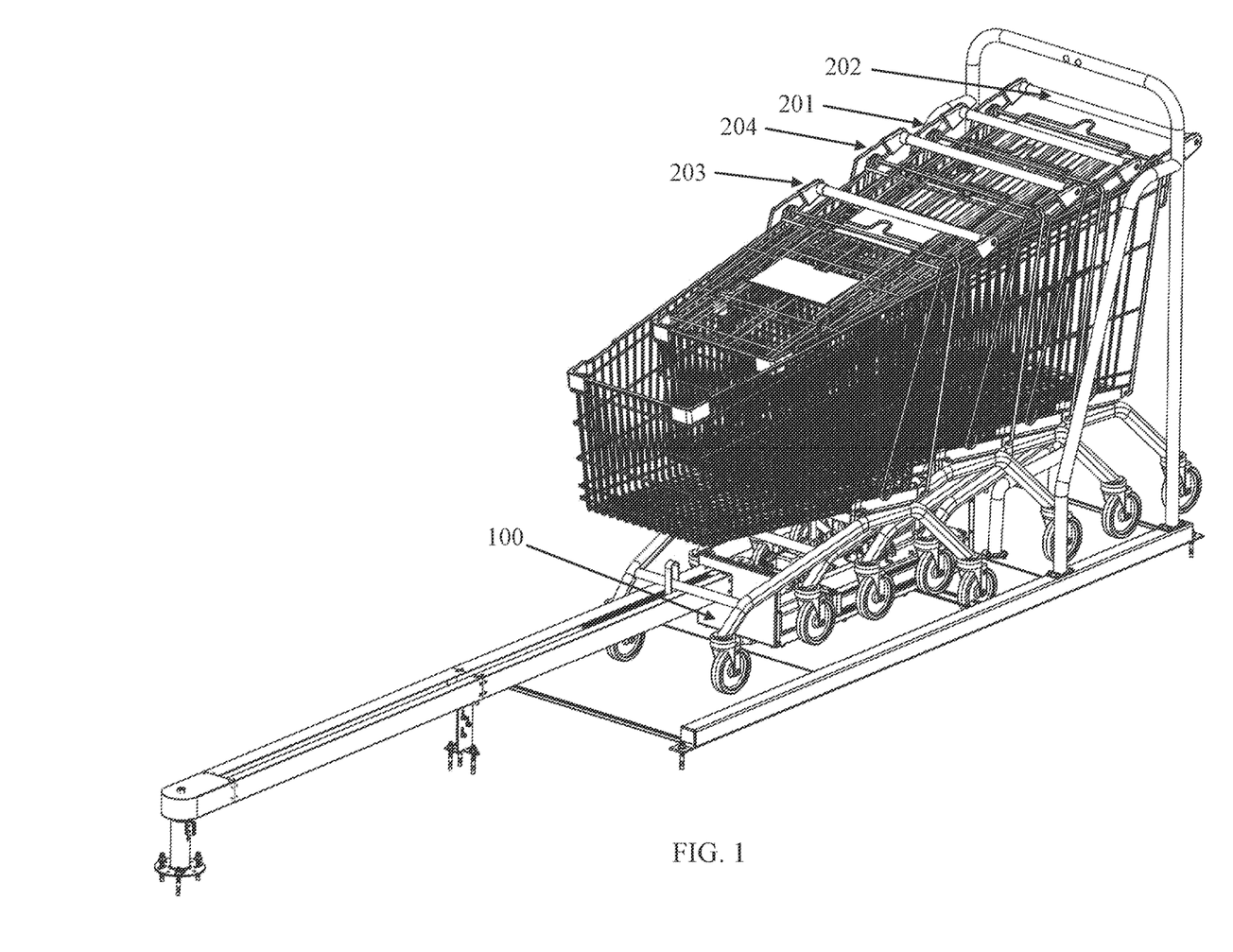
FIG. 1 is a schematic illustration of a device for dispensing carts, according to some embodiments of the present invention.
Figure 2:
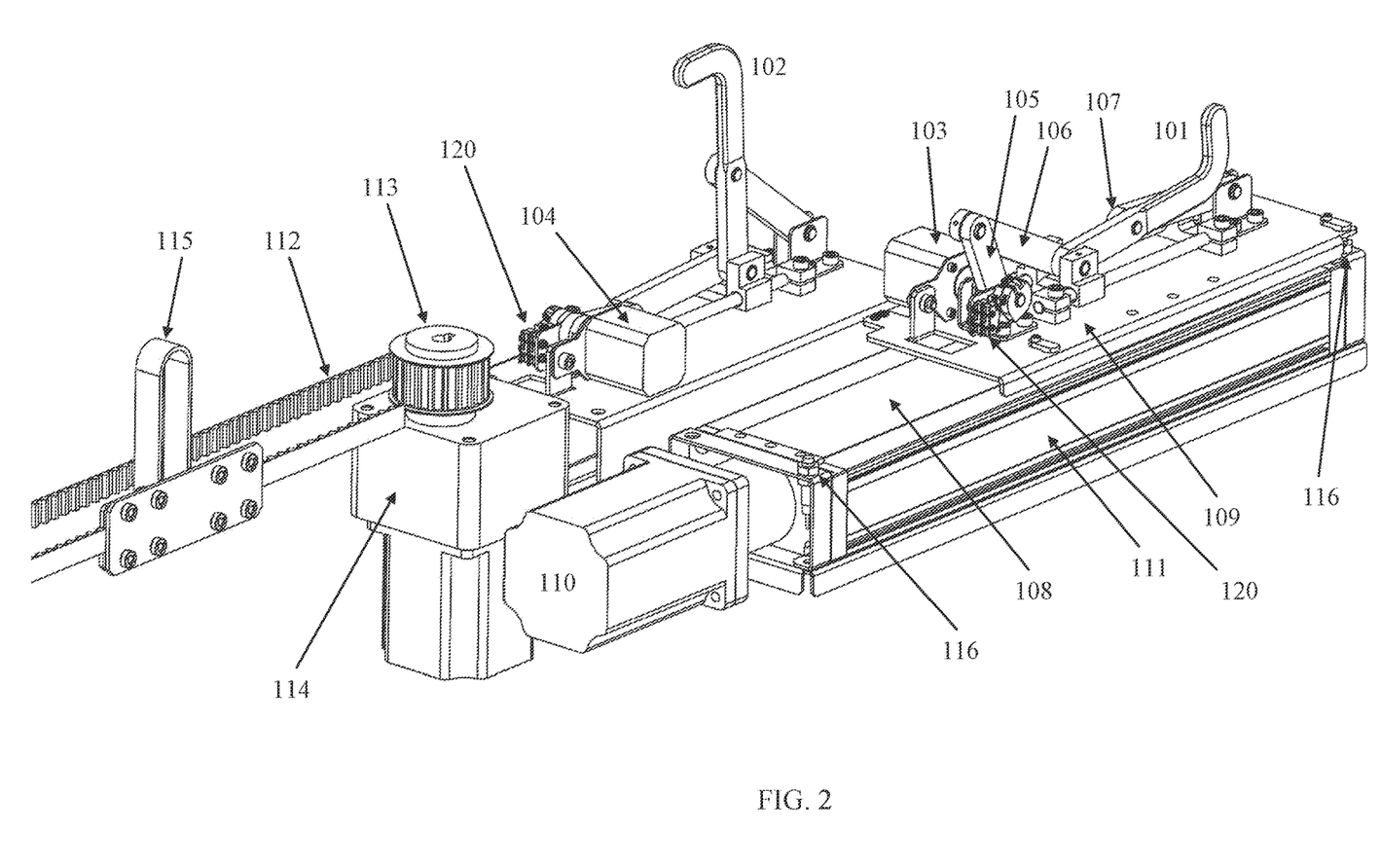
FIG. 2 is a schematic illustration of an inner mechanism of the device of FIG. 1, according to some embodiments of the present invention.

Referring now to the drawings, FIG. 1 is a schematic illustration of a device for dispensing carts, according to some embodiments of the present invention. Reference is also made to FIG. 2, which is a schematic illustration of an inner mechanism of the device of FIG. 1, according to some embodiments of the present invention.

The device 100 includes a dispensing lever 101 and a blocking lever 102. Each of levers 101 and 102 has an open position and a closed position, for example a raised position and a lowered position. When in closed position, as shown for dispensing lever 101 in FIG. 2, a cart can be moved over the levers and be pulled out and removed from the stack. When in open position, as shown for blocking lever 102 in FIG. 2, a cart is blocked by the lever cannot be moved over the lever. Optionally, dispensing lever 101 and/or blocking lever 102 are shaped to further hold a cart bar and prevent a cart from being pulled upward, for example, a bent shape, a hook shape, and/or any other shape that may hold a part of a cart bar. The carts may be of any type and/or size, for example shopping carts, trolleys and/or any other stackable vehicle.

Optionally, the position of dispensing lever 101 and/or of blocking lever 102 is changed from closed position to open position and/or from open position to closed position, by engine 103 and engine 104. Engine 103 and engine 104 may be, for example, step motors. Optionally, dispensing lever 101 and/or blocking lever 102 are connected to engine 103 and engine 104 by a set of shafts which translate the rotational movement of the engine to the movement of the lever between positions. For example, dispensing lever 101 is connected by shafts 105 and 106 to engine 103. When engine 103 turns and dispensing lever 101 is in closed position, shafts 105 and 106 push the lower end of dispensing lever 101 forward, while a shaft 107 pushes the middle part of dispensing lever 101 upward, so dispensing lever 101 is moved to open position. When engine 103 turns to the other direction and dispensing lever 101 is in open position, shafts 105 and 106 pull the lower end of dispensing lever 101 backward, while shaft 107 pulls the middle part of dispensing lever 101 downward, so dispensing lever 101 is moved to closed position. Optionally or alternatively, the position of dispensing lever 101 and/or of blocking lever 102 is changed by actuators.

Dispensing lever 101, and optionally also engine 103, is positioned on a base 109 which is moved forward and backward on track 108. Base 109 is moved forward and/or backward by an engine 110, such as a step motor, for example via a linear actuator 111 (such as a ball screw linear actuator), via a piston, and/or any other device creating linear motion.

The stack of carts is moved forward and backward by a drive belt 112, such as a Kevlar belt, that is moved by a belt wheel 113. Alternatively, other mechanical elements may be used to move the stack of carts, such as a chain. Belt wheel 113 may be operated by a belt engine 114, such as a step motor. The stack of carts may be connected to drive belt 112, for example, by a clasp 115 that holds the last cart in the stack, which is a dummy cart used as a locking cart 203. Alternatively, a pin is connected to drive belt 112 which pushes the stack of carts.

Optionally, the control of engine 103, engine 104, engine 110 and/or belt engine 114 is done by an electronic device which is connected or included in device 100, for example inside a head unit (not shown in the figures). The electronic device may be any kind of electronic, digital or computing device such as one or more printed circuits, a computer and/or any other electronic control. The electronic device may be programmed to operate the engines according to a sequence of dispensing a cart or a sequence of accepting a cart.

Optionally, the movement of base 109 and/or drive belt 112 is detected by sensor(s) 116, for example mechanic, magnetic, optic and/or any other sensor sensors. Sensors 116 may be connected to the electronic device, and be used as a backup to confirm the movement of base 109. This may be needed because step motors may reset unexpectedly, for example due to overload.

Optionally, the position changes of dispensing lever 101 and/or of blocking lever 102 is detected by sensor(s) 120, for example snap action switches, and/or any mechanic magnetic, optic and/or other sensors. Sensors 120 may be connected to the electronic device, and be used as a backup, as described above for sensors 116.

Figure 3:
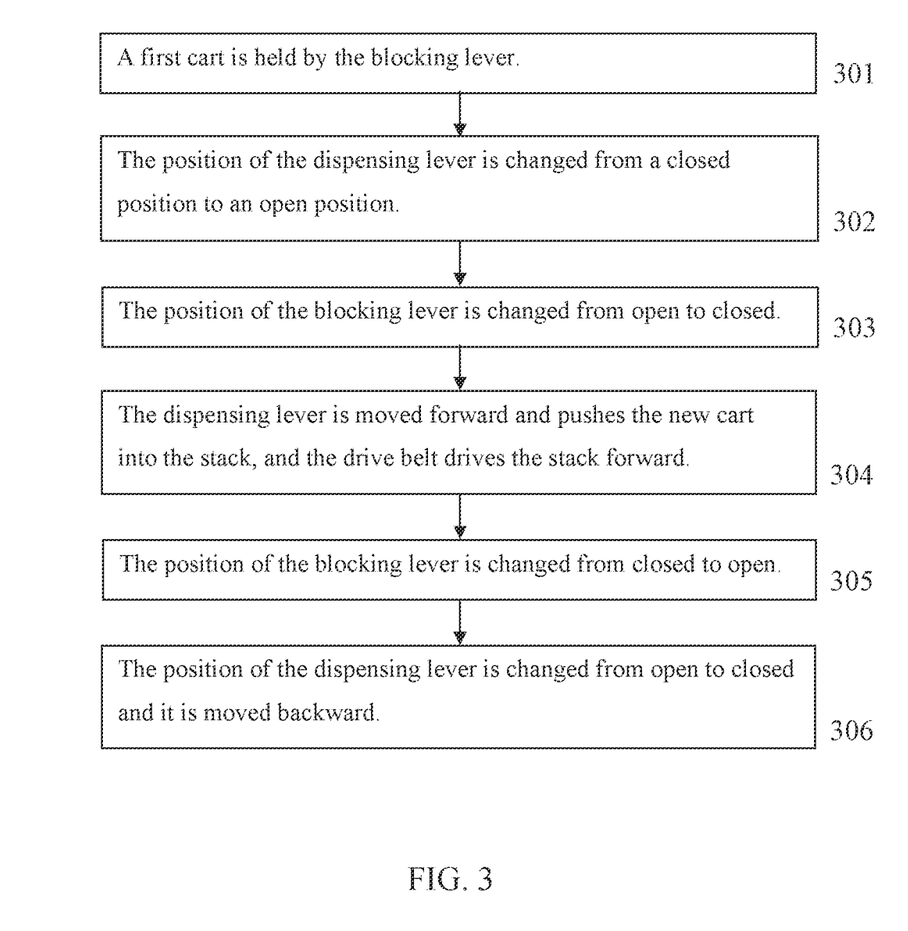
FIG. 3 is a flowchart schematically representing a method for accepting a cart into the stack, according to some embodiments of the present invention.

Reference is now made to FIG. 3, which is a flowchart schematically representing a method for accepting a cart into the stack, according to some embodiments of the present invention. Reference is also made to FIGS. 4A, 4B, 4C, 4D, 4E and 4F, which are schematic illustrations of dispensing lever 101 and blocking lever 102 in different positions according to the method of FIG. 3, according to some embodiments of the present invention.

Figure 4A:
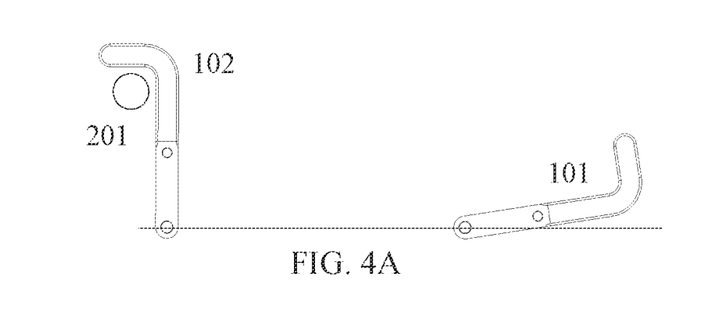
FIGS. 4A, 4B, 4C, 4D, 4E and 4F are schematic illustrations of a dispensing lever and a blocking lever in different positions according to the method of FIG. 3, according to some embodiments of the present invention.

First, as shown at 301 and FIG. 4A, a first cart 201 (only the cart bar is shown) of a plurality of carts that are disposed in a stack is held by blocking lever 102. At this initial state, as also shown in FIG. 1, dispensing lever 101 is at a closed position and located with base 109 at a backward location.

Reference is now made to FIGS. 5A, 5B, 5C and 5D, which are schematic illustrations of the device of FIG. 1 at different states, according to some embodiments of the present invention.

Optionally, the inner mechanism of device 100 is enclosed by enclosure 117. Optionally, enclosure 117 includes slit 118 and slit 119 that allow dispensing lever 101 and blocking lever 102, respectively, to move out of enclosure 117. Slit 118 is longer to allow dispensing lever 101 to move forward and backward.

Figure 4B:
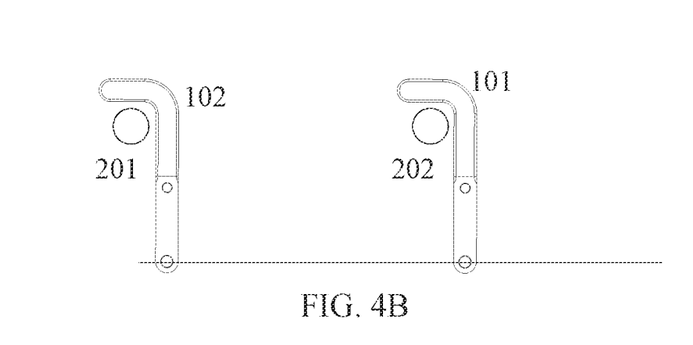
Figure 5A:
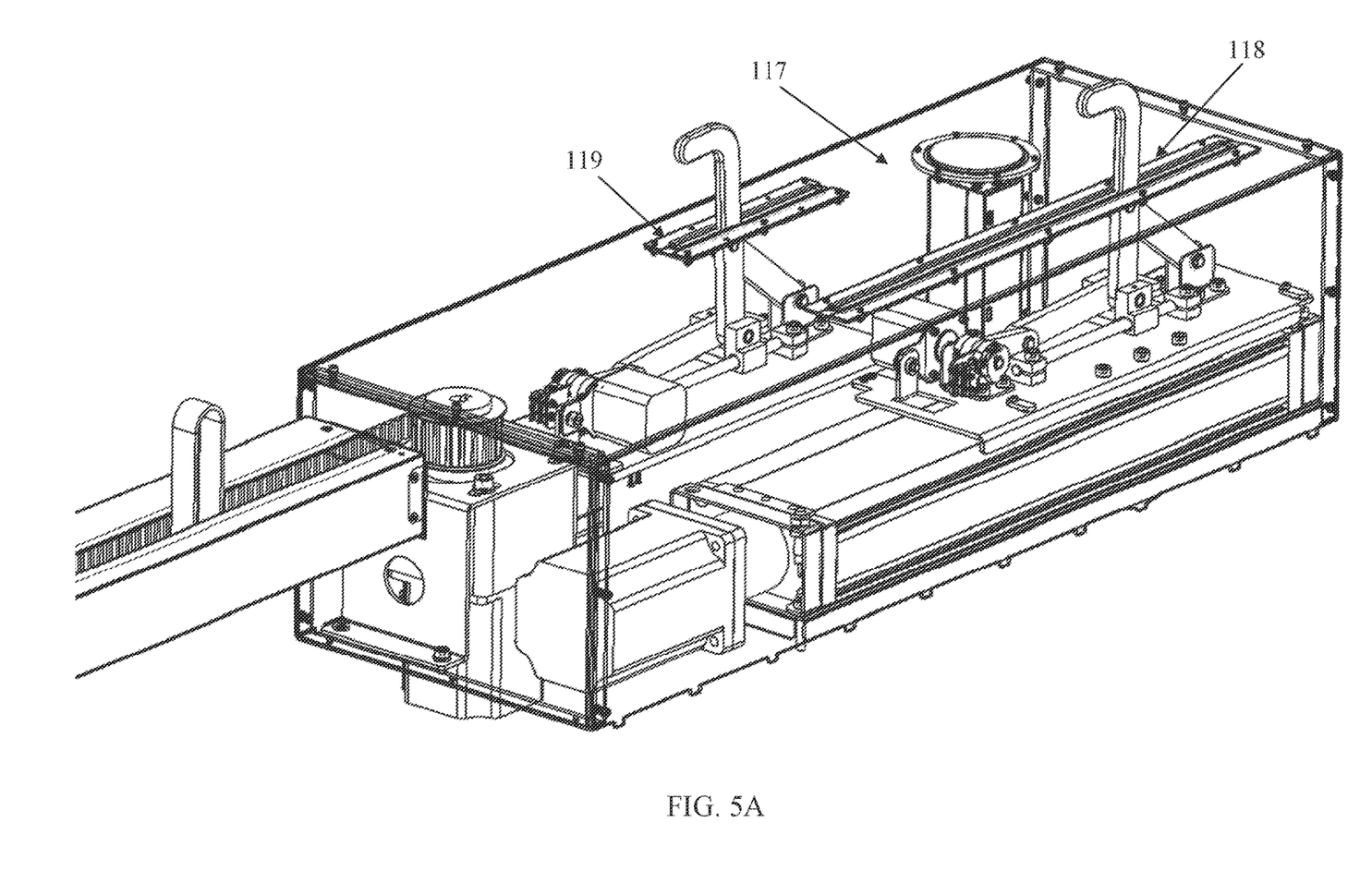
FIGS. 5A, 5B, 5C and 5D, which are schematic illustrations of the device of FIG. 1 at different states, according to some embodiments of the present invention.

Then, as shown at 302, FIG. 4B and FIG. 5A, a new cart 202 is newly positioned at the end of the stack. The position of dispensing lever 101 is changed from a closed position to an open position to block movement of new cart 202 out of the stack.

Figure 4C:
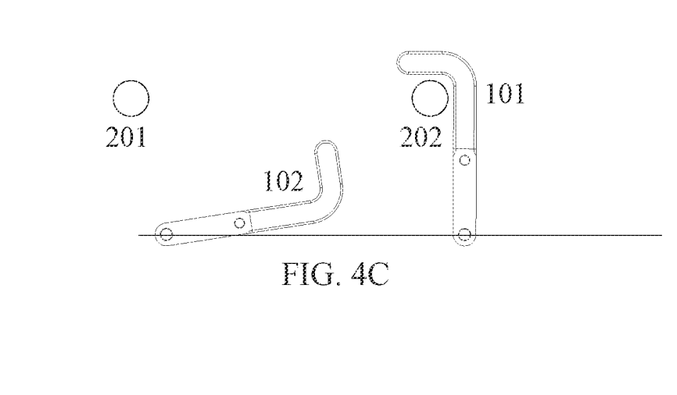
Figure 5B:
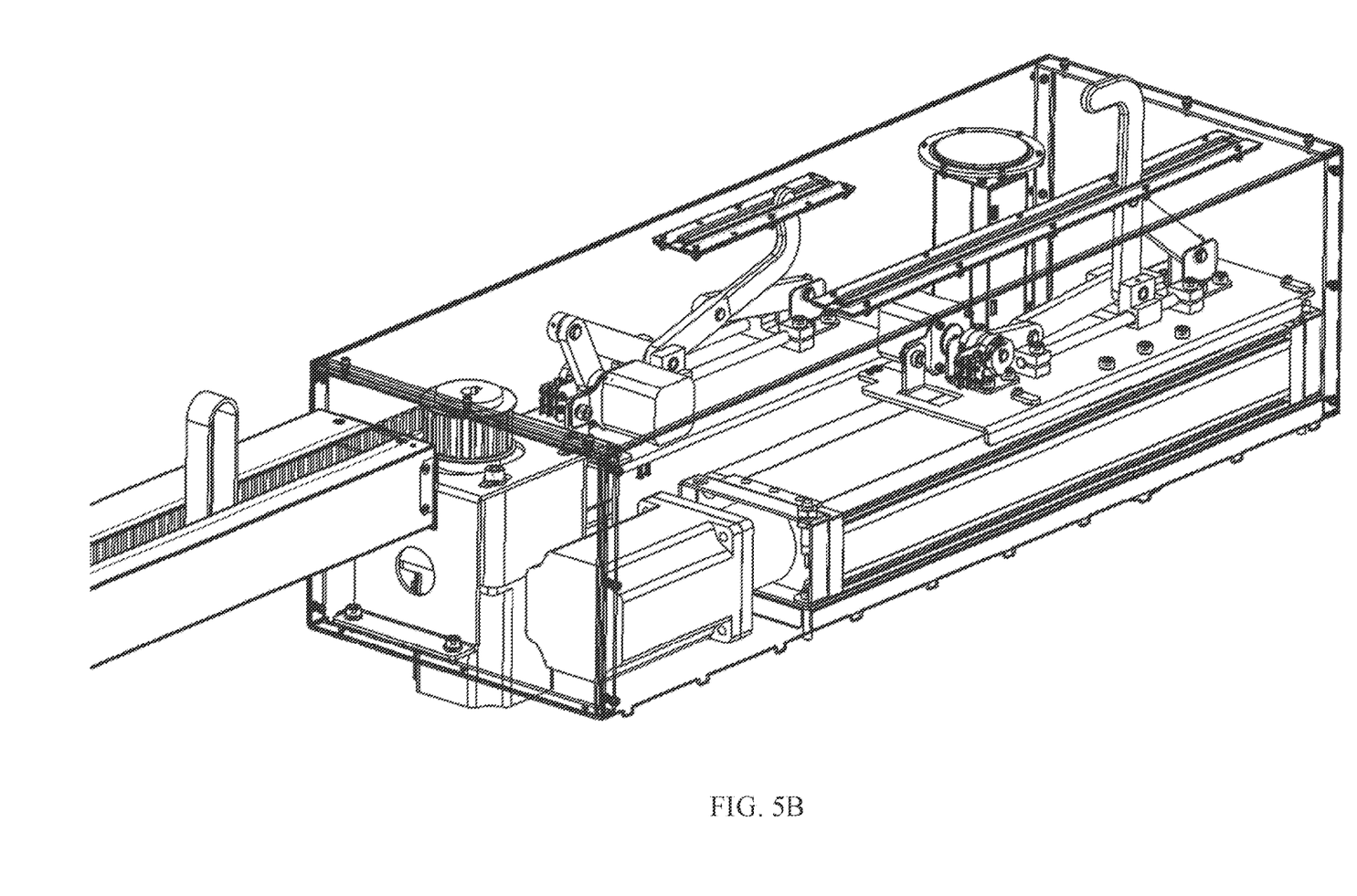

Then, as shown at 303, FIG. 4C and FIG. 5B, the position of blocking lever 102 is changed from open position to closed position, to allow new cart 202 to be inserted into the stack.

Figure 4D:
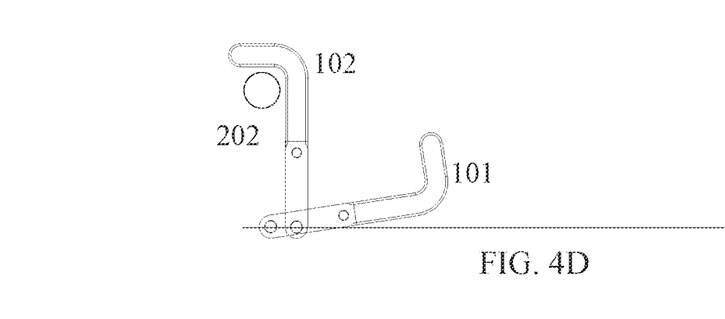
Figure 5C:
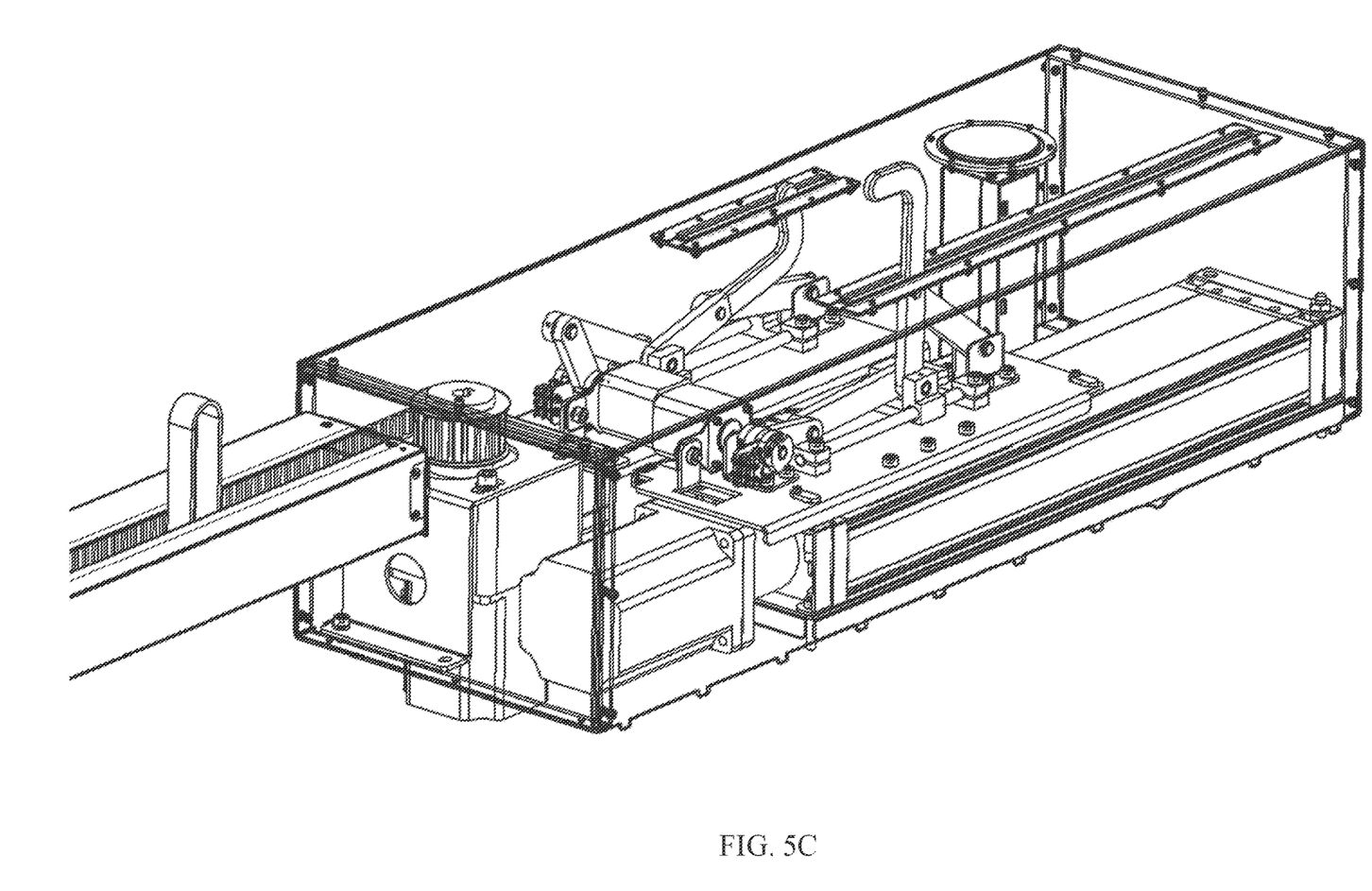

Then, as shown at 304, FIG. 4D and FIG. 5C, dispensing lever 101 is moved forward by base 109 and pushes new cart 202 into the stack. Simultaneously, drive belt 112 moves forward with locking cart 203, so new cart 202 may be pushed with the stack inwards by lever 101 and positioned behind blocking lever 102.

Figure 4E:
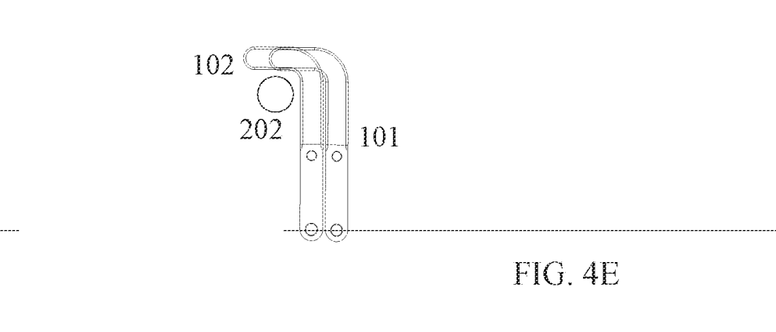
Figure 5D:
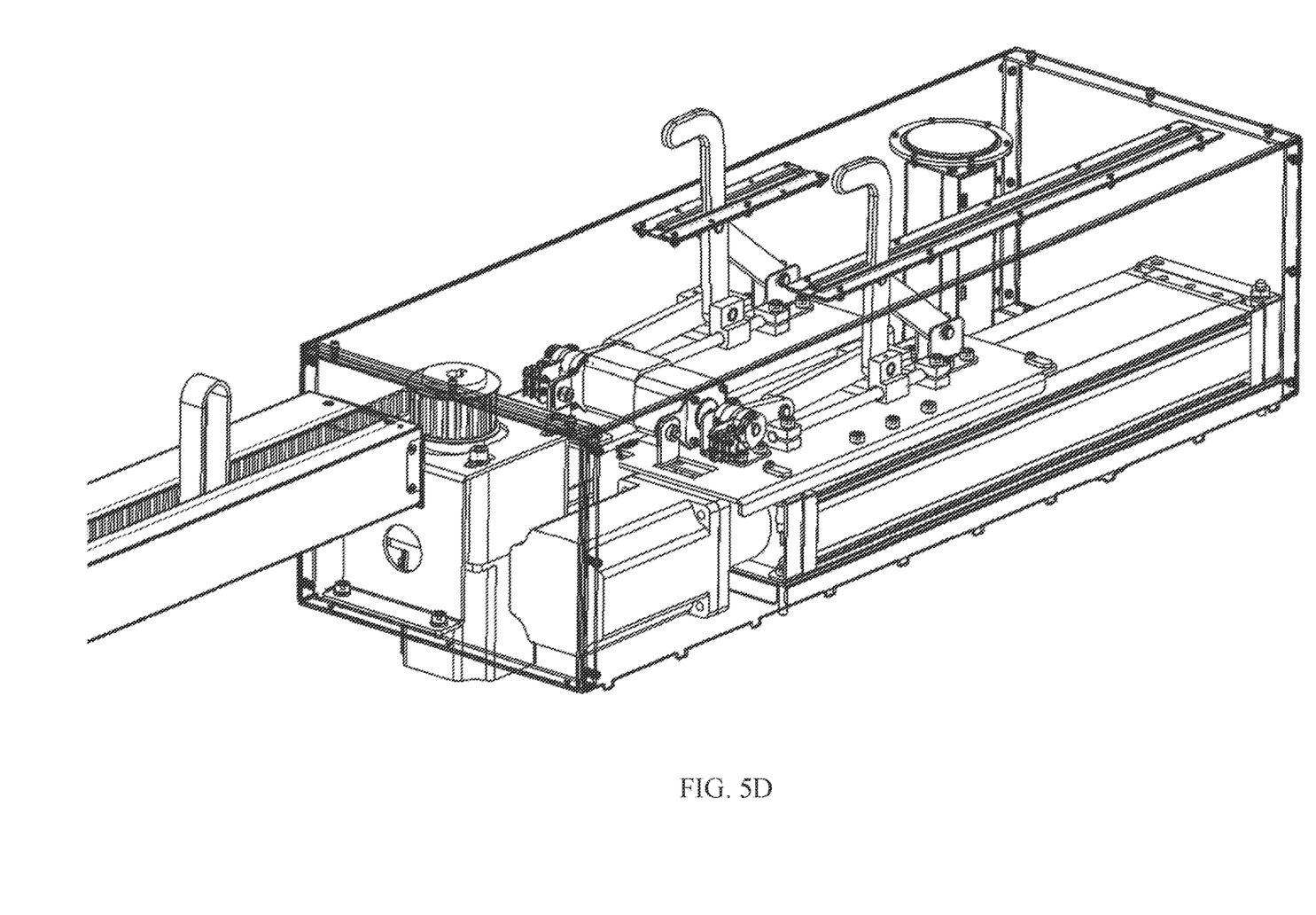

Then, as shown at 305, FIG. 4E and FIG. 5D, position of blocking lever 102 is changed from closed position to open position so blocking lever 102 is blocking movement of new cart 202 and the other carts in the stack.

Figure 4F:
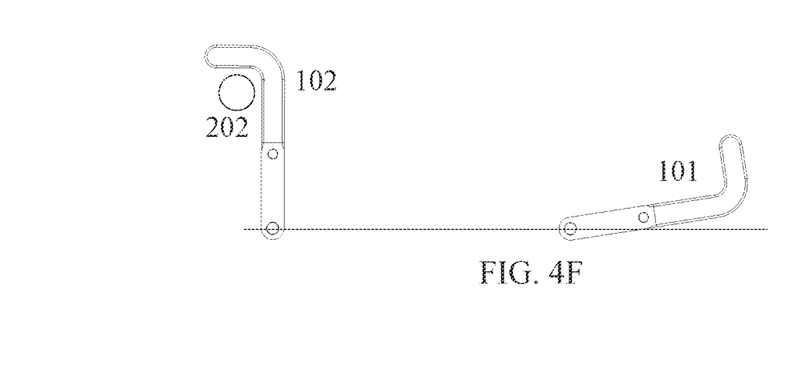

Finally, as shown at 306, FIG. 4F and FIG. 1, position of dispensing lever 101 is changed from open position to closed position and it is moved backward by base 109. This resulting state is similar to the initial state shown at 301 and FIG. 4A, so another new cart may be added to the stack, or a cart may be dispensed from the stack.

Figure 6:
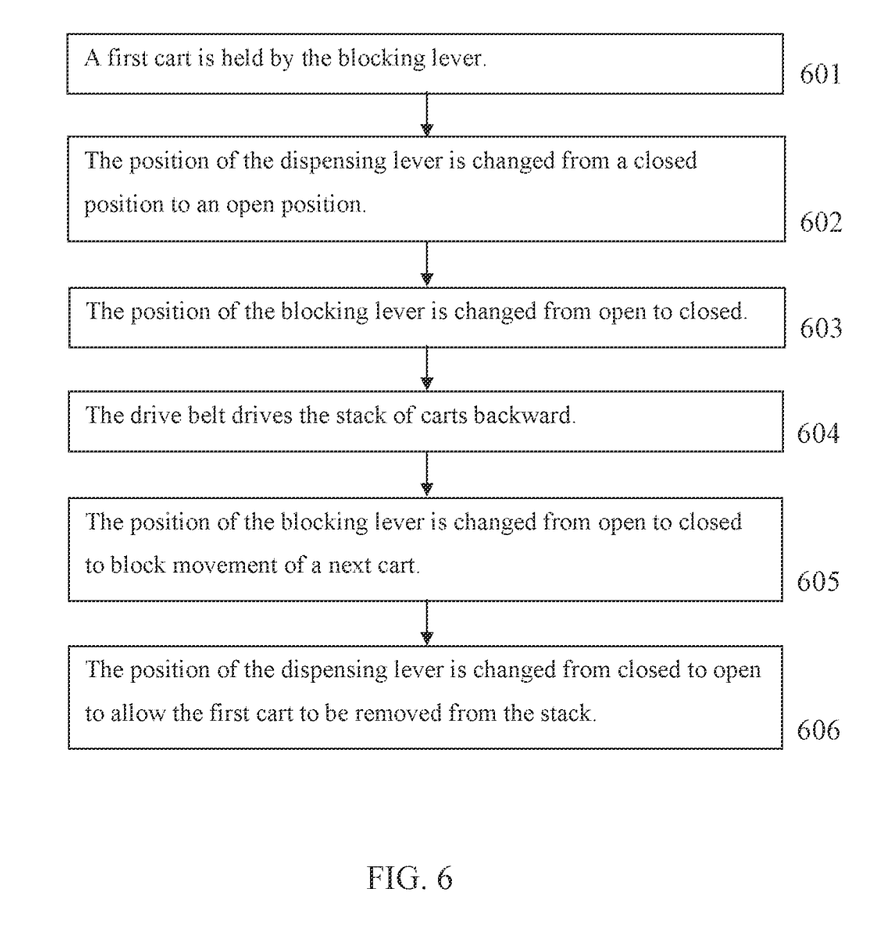
FIG. 6 is a flowchart schematically representing a method for dispensing a cart from the stack, according to some embodiments of the present invention.

Reference is now made to FIG. 6, which is a flowchart schematically representing a method for dispensing a cart from the stack, according to some embodiments of the present invention. This is a reversed process to the process of accepting a cart into the stack.

First, as shown at 601, first cart 201 of a plurality of carts that are disposed in a stack is held by blocking lever 102. At this initial state, as also shown in FIG. 1, dispensing lever 101 is at a closed position and located with base 109 at a backward location.

Then, as shown at 602, position of dispensing lever 101 is changed from a closed position to an open position to block movement of first cart 201 out of the stack. Optionally, dispensing lever 101 is moved forward by base 109, as shown at FIG. 5D.

Then, as shown at 603 and FIG. 5C, the position of blocking lever 102 is changed from open position to closed position, to allow first cart 201 to be moved backward.

Then, as shown at 604 and FIG. 5B, drive belt 112 drives the stack of carts backward, via locking cart 203, so a next cart 204 is positioned behind blocking lever 102, and first cart 201 positioned behind dispensing lever 101. Dispensing lever 101 is simultaneously moved backward by base 109.

Then, as shown at 605 and FIG. 5A, position of blocking lever 102 is changed from open position to closed position so blocking lever 102 is blocking movement of next cart 204 and the other carts in the stack, so they may not be pulled out of the stack together with first cart 201.

Then, as shown at 606, position of dispensing lever 101 is changed from closed position to open position so first cart 201 may be removed from the stack, for example, by a customer pulling the cart out of the stack. This resulting state is similar to the initial state shown at 601, FIG. 4A and FIG. 1.

Optionally, base 109 and drive belt 112 may be moved by one engine. For example, a worm screw gear may be connected to drive belt 112, and be moved by a worm wheel gear connected to engine 110. Optionally, a coupling mechanism is used to connect and disconnect drive belt 112 from engine 110.

Optionally, device 100 and/or the electronic device are connected to an interface which allows customers to unlock a cart, for example by payment. The interface may include, for example, a screen, an input module, payment method(s), identification methods and/or any other function.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant carts and/or trolleys will be developed and the scope of the terms cart and trolley is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for accepting a cart into a cart stack, comprising:
    holding a first cart of a plurality of carts disposed in a stack by a blocking lever, said blocking lever is in an open position so said blocking lever is blocking said first cart from being pulled backward to be removed from said stack;
    changing position of a dispensing lever from a closed position which allows a second cart to be added into the stack, to an open position wherein said dispensing lever is blocking said second cart from being pulled back out of said stack;
    changing position of said blocking lever from said open position to a closed position;
    moving said dispensing lever forward to push said second cart into said stack;
    simultaneously driving said plurality of carts forward by a drive belt and moving said dispensing lever forward to push said second cart with said plurality of carts;
    changing position of said blocking lever from said closed position to said open position so said blocking lever is blocking said second cart from being pulled backward to be removed from said stack.

2. A method for dispensing a cart from a cart stack, comprising:
    holding a first cart of a plurality of carts disposed in a stack by a blocking lever, said blocking lever is at an open position so said blocking lever is blocking said first cart from being pulled backward to be removed from said stack;
    changing position of a dispensing lever from a closed position to an open position;
    changing position of said blocking lever from said open position to a closed position;
    driving said plurality of carts backward by a drive belt so said first cart is blocked by said dispensing lever from being pulled backward to be removed from said stack;
    changing position of said blocking lever from said closed position to said open position so said blocking lever is blocking a second cart from being pulled backward to be removed from said stack; and
    changing position of said dispensing lever from said open position to said closed position to allow said first cart to be pulled backward and be removed from said stack.

3. A device for dispensing and locking carts, comprising:
a dual-lever mechanism adapted to lock a plurality of carts disposed in a locked stack, the dual-lever mechanism having:
a blocking lever and a dispensing lever, and
a base adapted to move the dispensing lever forward and backward with respect to the stack;
wherein the dual-lever mechanism controls one or more engines to change separately each of a blocking lever and a dispensing lever from blocking at least one of the plurality of carts from moving in an open position to not blocking any of the plurality of carts from moving in a closed position;
a drive connected to a connection element adapted to be mechanically connected to at least one of the plurality of carts disposed in the locked stack;
wherein the dual-lever mechanism is adapted to lock the stack when the blocking lever is in the open position;
wherein the dual-lever mechanism is adapted to add a new cart at an end of the locked stack when the new cart is at an end of the locked stack by controlling the one or more engines to change interchangeably the levers from the open position to the closed position and to move the base in parallel to the stack.

4. The device of claim 3, wherein the dual-lever mechanism is adapted to add the new cart at the end of the locked stack by:
changing the dispensing lever from the closed position to the open position to block a movement of the new cart out of the stack and then changing the blocking lever from the open position to the closed position to allow the new cart to be inserted further into the stack;
after the dispensing lever is in the open position and the blocking lever is in the closed position, the dispensing lever is moved by the base to push the new cart into the stack; and
then the blocking lever is changed from the closed position to the open position to block movement of the new cart together with the other carts in the stack.

5. The device of claim 3, wherein the open position is a raised position and the closed position is a lowered position.

6. The device of claim 3, wherein at least one of the dispensing lever and blocking lever has bent shape.

7. The device of claim 3, wherein at least one of the dispensing lever and blocking lever is capable of changing position from the open position to a closed position to allow movement of at least one cart of the plurality of carts.

8. The device of claim 3, wherein the dispensing lever is connected to the one or more engines by a set of shafts.

9. The device of claim 3, wherein the base is movable by an engine via a linear actuator.

10. The device of claim 3, wherein the base is movable over a rail.

11. The device of claim 3, wherein a movement of the base is detected by at least one sensor.

12. The device of claim 3, further comprising: an enclosure having slits for the dispensing lever and the blocking lever.

13. The device of claim 3, wherein the dual-lever mechanism is adapted to dispense a cart from the locked stack, by controlling the one or more engines to
change the dispensing lever from the closed position to the open position to block movement the carts of the stack and the blocking lever from the open position to the closed position to allow a first cart of the stack to be moved backward;
use the drive to drive the stack of carts backward while the first cart is positioned behind dispensing lever and simultaneously move the dispensing lever backward by the base;
change the blocking lever from the open position to the closed position so that the blocking lever is blocking the movement of a cart which follows the first cart and so that one or more other carts in the stack are not be pulled out of the stack together with the first cart; and
change the dispensing lever from the closed position to the open position so the first cart may be removed from the stack by pulling.

\* \* \* \* \*